(12) United States Patent
Pepper

(10) Patent No.: US 10,239,200 B2
(45) Date of Patent: Mar. 26, 2019

(54) ROOF SQUARE WITH BLADE LOCKING AND RELEASE MECHANISM

(71) Applicant: Sean Roger Michael Pepper, Mandurah (AU)

(72) Inventor: Sean Roger Michael Pepper, Mandurah (AU)

( * ) Notice: Subject to any disclaimer, the term of this patent is extended or adjusted under 35 U.S.C. 154(b) by 104 days.

(21) Appl. No.: 15/534,510

(22) PCT Filed: Dec. 17, 2015

(86) PCT No.: PCT/AU2015/000756
§ 371 (c)(1),
(2) Date: Jun. 9, 2017

(87) PCT Pub. No.: WO2016/094933
PCT Pub. Date: Jun. 23, 2016

(65) Prior Publication Data
US 2017/0341219 A1  Nov. 30, 2017

(30) Foreign Application Priority Data

Dec. 18, 2014 (AU) ............................ 2014277771
Oct. 30, 2015 (AU) ............................ 2015904445

(51) Int. Cl.
| | |
|---|---|
| *B43L 7/12* | (2006.01) |
| *B25H 7/02* | (2006.01) |
| *G01C 15/02* | (2006.01) |
| *G01B 3/56* | (2006.01) |
| *G01B 3/00* | (2006.01) |
| *B43L 7/14* | (2006.01) |

(52) U.S. Cl.
CPC .............. *B25H 7/02* (2013.01); *G01B 3/006* (2013.01); *G01B 3/563* (2013.01); *G01B 3/566* (2013.01); *G01C 15/02* (2013.01); *B43L 7/12* (2013.01); *B43L 7/14* (2013.01)

(58) Field of Classification Search
CPC .............................. E04G 21/1891; B43L 7/12
USPC ........................................... 33/417, 479, 480
See application file for complete search history.

(56) References Cited

U.S. PATENT DOCUMENTS

| | | |
|---|---|---|
| 778,808 A | 12/1904 | Starrett |
| 1,139,648 A | 5/1915 | Demmer |
| 2,056,948 A | 10/1936 | Bernt |
| 5,915,806 A * | 6/1999 | Levee ....................... B25F 1/00 33/42 |
| 6,049,990 A * | 4/2000 | Holland .................... B43L 7/02 33/464 |
| 6,134,795 A | 10/2000 | Hitchcock |
| 6,839,974 B1 | 1/2005 | Hitchcock |
| (Continued) | | |

FOREIGN PATENT DOCUMENTS

| | | |
|---|---|---|
| AU | 2014224146 | 4/2015 |
| DE | 29703943 | 5/1997 |

*Primary Examiner* — G. Bradley Bennett
(74) *Attorney, Agent, or Firm* — Sand, Sebolt & Wernow Co., LPA

(57) ABSTRACT

A roof square for marking rafters comprising a right angle triangular body with a marking blade pivotally mounted adjacent the right angle. Either side of the square adjacent the right angle is held against the stock to be marked, and the blade used to mark either a plumb cut or a foot cut. The blade retracts to allow marks to be made at a measured depth. The tool can also be used as a conventional square to make 90 and 45 degree marks.

10 Claims, 23 Drawing Sheets

(56) References Cited

U.S. PATENT DOCUMENTS

| | | | | |
|---|---|---|---|---|
| 7,114,264 B1* | 10/2006 | Hurley | ............... | B25H 7/00 33/423 |
| 7,478,485 B1 | 1/2009 | Rogell | | |
| 7,743,521 B2 | 6/2010 | O'morrow, Sr. | | |
| 2002/0148127 A1* | 10/2002 | Dana | ............... | B25H 7/00 33/456 |
| 2007/0011896 A1* | 1/2007 | Diaz | ............... | B43L 7/005 33/471 |
| 2011/0107610 A1* | 5/2011 | Farr | ............... | B43L 7/12 33/421 |
| 2012/0285028 A1* | 11/2012 | Atwood | ............... | B43L 7/10 33/452 |
| 2012/0311880 A1* | 12/2012 | Doggett | ............... | B43L 7/14 33/452 |
| 2013/0227846 A1* | 9/2013 | Buzzell | ............... | B43L 7/02 33/32.2 |
| 2014/0373373 A1 | 12/2014 | Hershkovich | | |
| 2015/0168122 A1* | 6/2015 | Cruickshanks | ............... | G01B 3/563 33/425 |
| 2015/0276367 A1* | 10/2015 | Lamanna | ............... | B25H 7/02 33/404 |

\* cited by examiner

ROOF SQUARE WITH BLADE LOCKING AND RELEASE MECHANISM

FIELD OF THE INVENTION

The present invention relates to a carpentry tool, in particular a tool to aid in marking out roofing rafters. However the tool is suitable for marking any material that runs on an incline and requires horizontal and/or vertical marks or cuts.

BACKGROUND TO THE INVENTION

The invention will be described primarily in relation to use on roofing rafters, however it is not limited to such and can be used to aid in marking vertical and horizontal cuts on any material that runs at an incline, for example stair case stringers.

A roofing carpenter often employs several tools to aid in marking out rafters, typically two bevels and a square. Requiring multiple tools is both cumbersome and inefficient as the carpenter switches frequently between the tools. Carrying and keeping track of multiple tools is also inconvenient, with one tool invariably being left at the wrong end of the rafter.

The object of this invention is to provide a roofing tool that combines the functionality of several traditional tools to alleviate the above problems, or at least provides the public with a useful alternative.

SUMMARY OF THE INVENTION

In a first aspect the invention comprises a tool for marking rafters, comprising a body with a top layer, a bottom layer, a first plumb side, a second foot side disposed at 90 degrees to the first plumb side, and a marking blade pivotally mounted to a pivot pin proximal the vertex of the first and second sides, wherein the marking blade passes between the top layer and the bottom layer.

Preferably the marking blade is slidably mounted to the pivot pin by a void extending along the marking blade and the tool further comprises a lock for preventing movement of the locking blade with respect to the body which also engages the void of the blade.

The void in the marking blade may extend to a first end of the blade therefore allowing the blade to be disengaged from the lock, or the lock may be moveable thereby allowing the lock to be disengaged from the blade.

The pivot pin may also be moveable or pass through the void extending to the end of the blade to allow it to be disengaged from the blade.

The tool may comprise a third hypotenuse side disposed at 45 degrees to the first side and the second side which the blade may pass through or the blade may pass through the first and second sides.

Preferably the tool further comprises a first scale on a face of the top layer indicating angular displacement of the blade with respect to the second side, and a second scale on a face of the bottom layer, wherein the second scale is set at a ratio of the square root of two to one to the first scale.

It should be noted that any one of the aspects mentioned above may include any of the features of any of the other aspects mentioned above and may include any of the features of any of the embodiments described below as appropriate.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

COMPONENT LISTING

Figure 1:
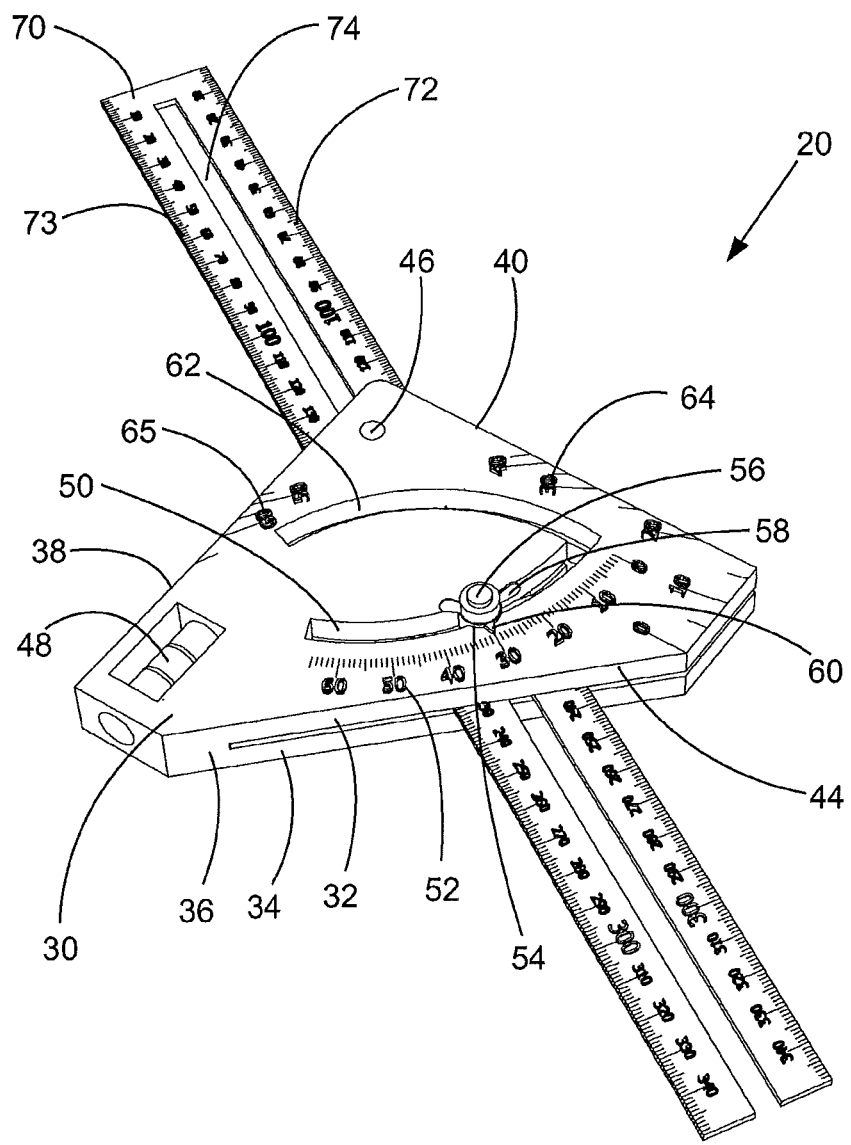
FIG. 1 is a first perspective view of the roof square of the present invention in accordance with a first embodiment.

The drawings include the following integers:
20 Roof Square (first embodiment—first configuration)
21 Roof Square (first embodiment—second configuration)

30 Body
32 Top layer
34 Bottom layer
36 Spacer
38 Plumb side
40 Foot side
42 90 degree corner
44 Hypotenuse side
46 Pivot pin
48 Level vial
50 Primary race
52 Primary scale
54 Lock
56 Lock bolt
58 Lock nut
60 Scale pointer
62 Secondary race
64,65 Secondary scale
70 Marking blade
72,73 Ruler markings
74 Void
80 Rafter
82 Marked rafter
84 Cut rafter
90 Top plumb mark
92 Bottom plumb mark
94 Bottom foot mark
96 Bird's mouth plumb cut
98, 98a, 98b Bird's mouth foot mark
100 90 degree mark
102 45 degree mark
200 square (second embodiment)
201 first configuration
202 second configuration
203 hybrid configuration
210 blade
211 scale
212 void
213 engagement void
214 first closed end
215 second closed end (engagement end)
216 left side
220 body
230 top layer
231 front face
232 primary (numeric) scale
223 20 degree mark
234 primary alphabetic scale
235 C mark (front primary)
236 secondary (numeric) scale
237 secondary alphabetic scale
238 0 degree mark
239 secondary scale indicator
240 body void
250 bottom layer
251 rear face
252 hip and valley primary (rear alphabetic) scale
253 hip and valley secondary (rear alphabetic) scale
255 C mark (rear primary)
260 first vial
270 second vial
271 vial bubble
280 plumb cut side
290 foot cut side
300 hypotenuse side
301 return end
310 pivot pin 311 pivot housing
320 primary race
330 race step
340 secondary race
350 locking race
351 locking platform
352 locking void
353 locking recess
354 locking step
360 square race
362 locking recess
370 locking bolt
371 lock nut
400 rafter

DETAILED DESCRIPTION OF THE
INVENTION

The following detailed description of the invention refers to the accompanying drawings. Wherever possible, the same reference numbers will be used throughout the drawings and the following description to refer to the same and like parts. Dimensions of certain parts shown in the drawings may have been modified and/or exaggerated for the purposes of clarity or illustration.

The present invention provides a roof square for marking rafters comprising a right angle triangular body with a marking blade pivotally mounted adjacent the right angle. Either side of the square adjacent the right angle is held against the stock to be marked and the blade used to mark either a plumb cut or a foot cut. The blade retracts to allow marks to be made at a measured depth. The tool can also be used as a conventional square to make 90 and 45 degree marks. The tool can be used in a primary configuration which provides greater accuracy and depth of marking or a secondary configuration which is quicker to use.

The invention is presented in two different embodiments, the first embodiment is shown as 20 in FIGS. 1 to 15; the second embodiment is shown in FIGS. 16 to 28.

Figure 2:
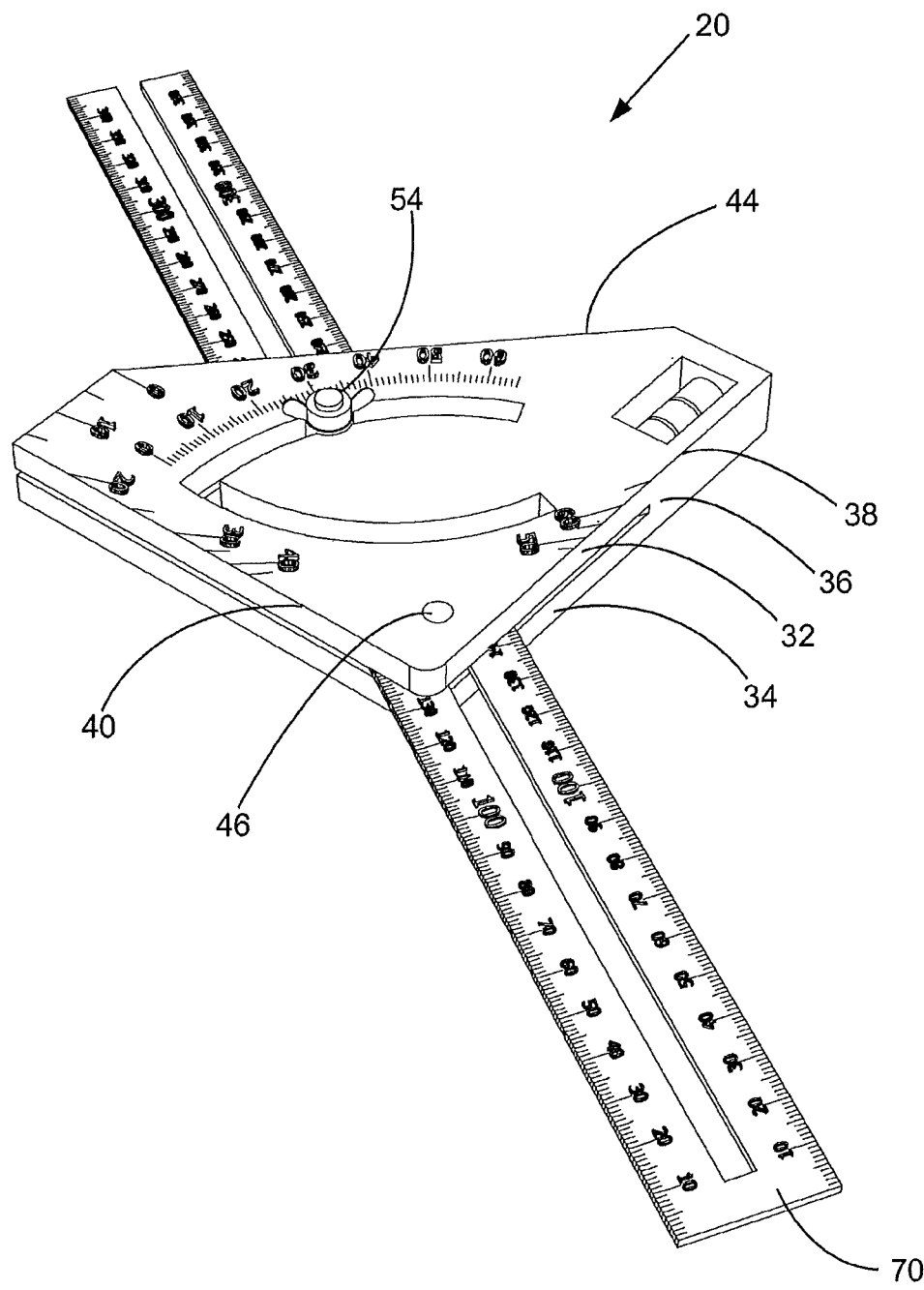
FIG. 2 is a second perspective view of the square.

FIGS. 1 and 2 provide perspective views of the roof square 20 according to a first embodiment in its primary configuration. The square 20 comprises a generally triangular body 30 with plum side 38 and foot side 40 perpendicular to each other and a hypotenuse side 44 at 45 degrees to the other two sides. Mathematically the body 30 can be described as an isosceles right triangle, albeit with two vertices removed. The body consists of a top layer 32 and bottom layer 34 separated by spacer 36. Preferably the body is formed as a single piece of plastic. The spacer is just large enough to ensure that the two sides are sturdily joined, leaving room between the sides for housing a marking blade 70. The two sides are further joined by pivot pin 46 which engages void 74 of the blade. The blade can rotate about the pivot pin 46 as well as extend from and retract into the body, passing through the hypotenuse side as needed. The blade can be set accurately to any angle between 0 and 65 degrees with respect to the foot side with the aid of the primary scale 52. A lock 54 passes through the void 74 of the blade and a primary race 50 to secure the blade at a desired angle. The lock 54 comprises a bolt 56 and wing nut 58 sitting atop a scale pointer 60. Tightening the wing nut prevents both rotation and extension/retraction of the blade. The blade includes scales 72 and 73 which can be used to accurately set how far the blade protrudes from either the foot side or the plumb side. The void 70 extends to one end of the blade, allowing it to be disengaged from the lock 54, or even allowing the blade to be removed completely from the body so that it may be used as a ruler if desired. A void in the body holds a level vial 48 to aid in horizontal alignment of the square. The body also includes secondary race 62 and secondary scale 64 and 65, which will be discussed in the context of the secondary configuration further below.

By having the pivot pin 46 adjacent to the intersection of the foot side 40 and plumb side 38, the blade 70 can be used for marking when either of the sides is placed against a piece of wood. As the foot side and plumb side are at 90 degrees to each other the corresponding marks will also be at 90 degrees to each other as is desired for making foot and plumb marks on a rafter. The pitch of the rafter is set on the primary scale 60 and then foot side 40 or plumb side 38 is placed against the rafter and the blade 70 used to make a foot mark or plumb mark respectively.

Figure 6:
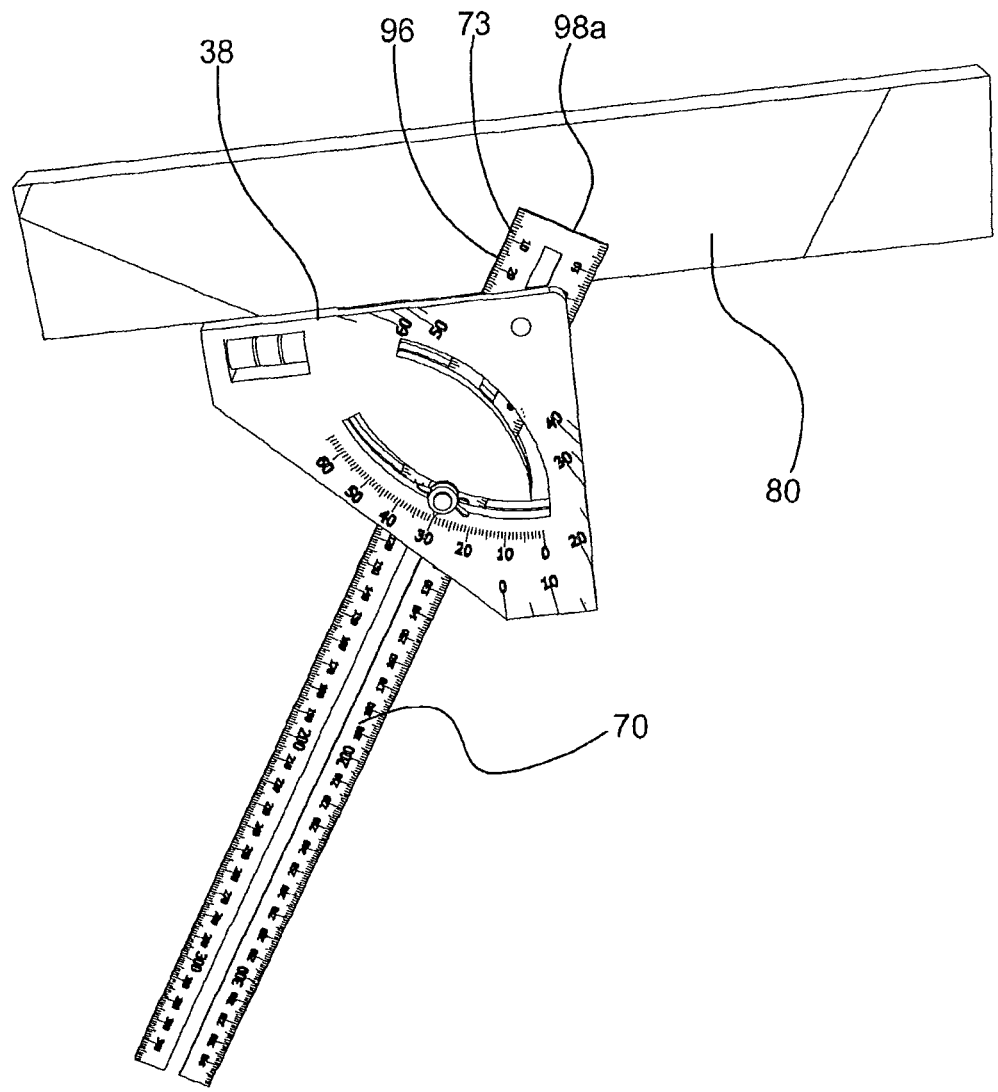
FIG. 6 shows the square being used to mark a plumb cut of a bird's mouth.
Figure 7:
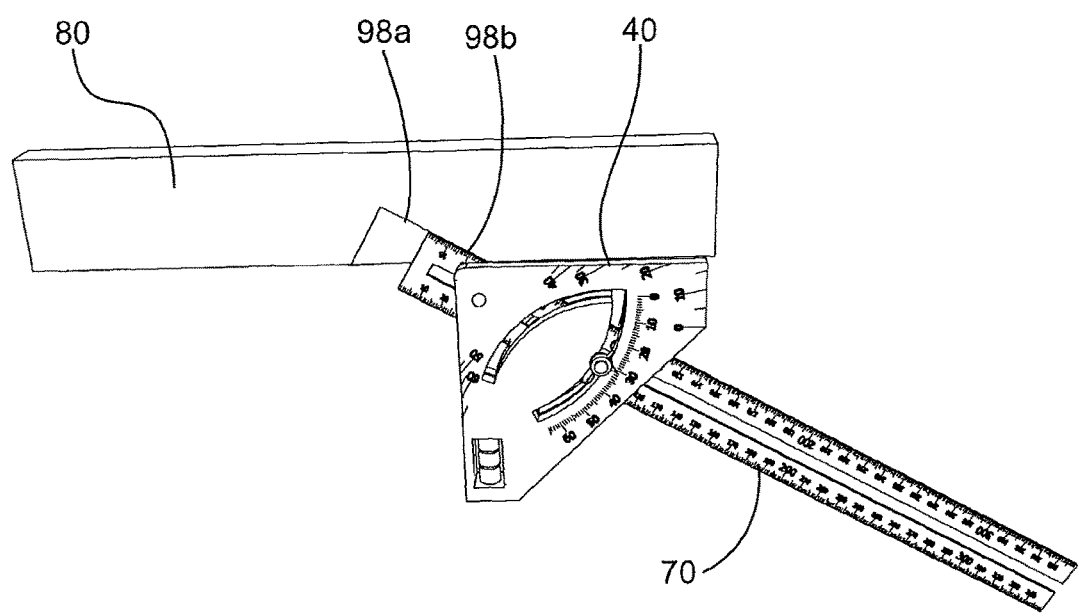
FIG. 7 shows the square being used to mark a foot cut of a bird's mouth.
Figure 8:
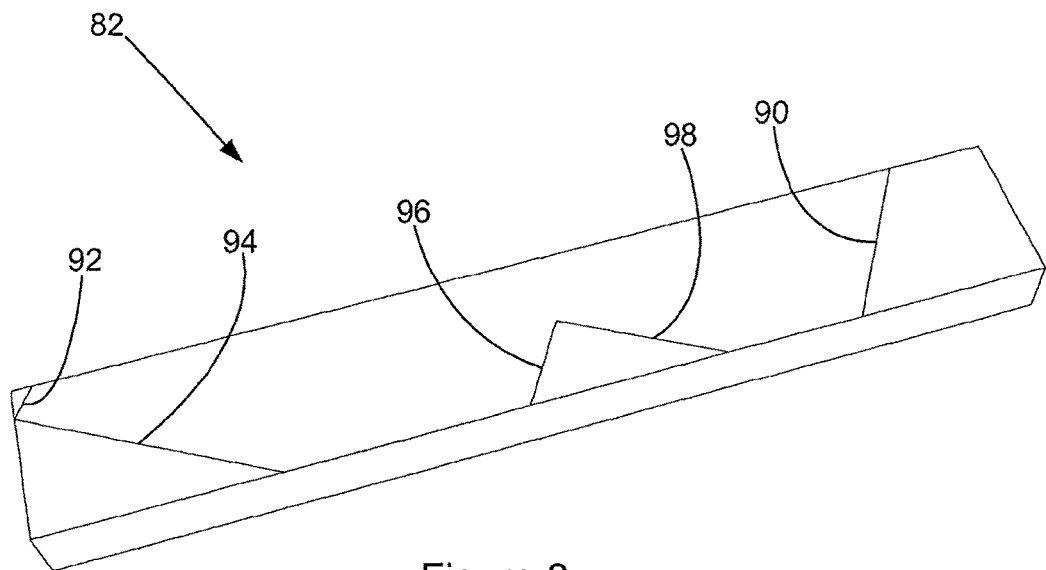
FIG. 8 shows a rafter as marked with the aid of the square.
Figure 9:
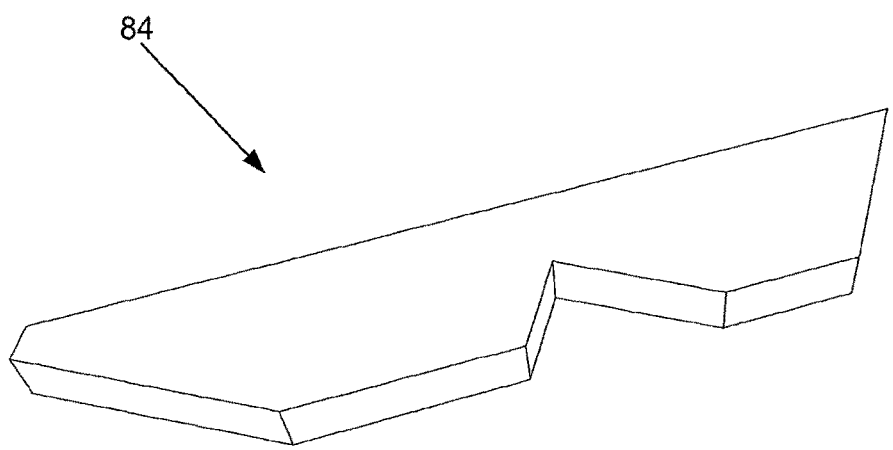
FIG. 9 shows the rafter of FIG. 8 cut.

Marking of a rafter with various foot and plumb marks is shown in FIGS. 3 to 7 with the resultant marked rafter shown as 82 in FIG. 8 and the same rafter cut shown as 84 in FIG. 9.

Figure 3:
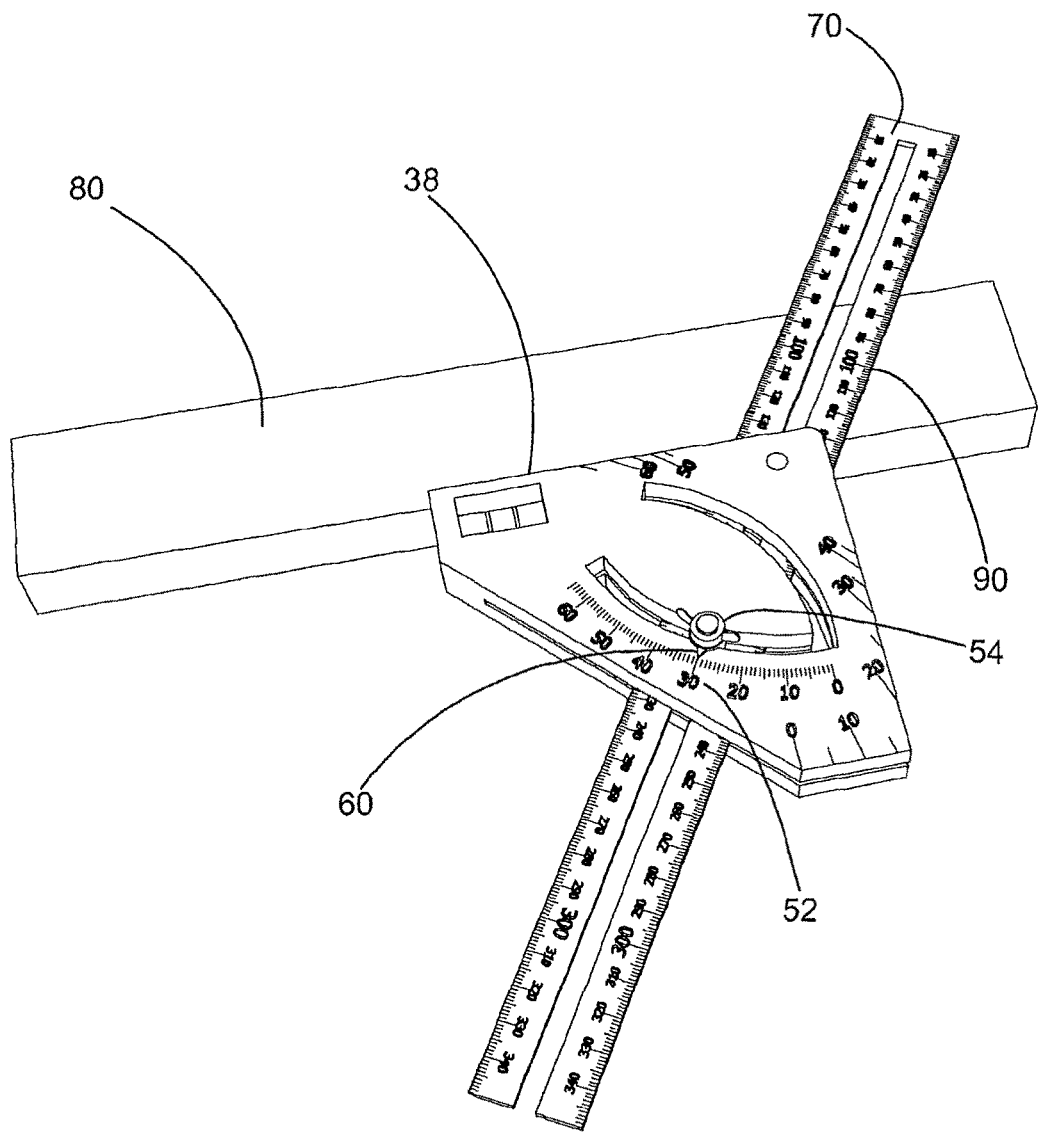
FIG. 3 shows the square being used to mark a top plumb cut on a rafter.

FIG. 3 shows top plumb mark being made on a rafter. The lock 54 is first released and the blade rotated 70 until the scale pointer 60 aligns with the desired pitch angle of the rafter on the primary scale 52. In this example a pitch angle of 30 degrees is set. The blade may also be extended if necessary. The lock is then tightened to prevent the blade from moving. The plumb edge 38 of the square is then placed against the rafter 80 and the blade used to make the top plumb mark 90. Once the blade has been set to the desired angle any number of plumb or foot marks can be made without further adjustment.

Figure 4:
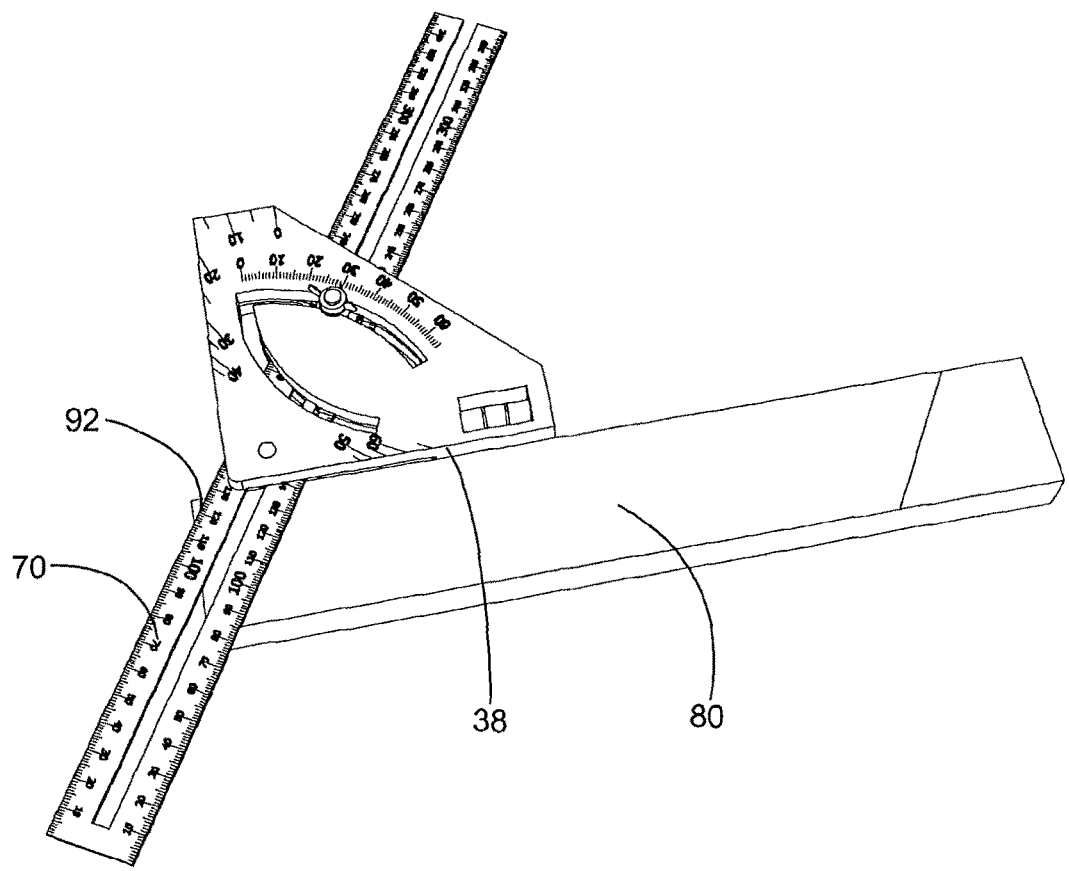
FIG. 4 shows the square being used to mark a bottom plumb cut.

In FIG. 4 a bottom plumb mark 92 is being made. Again the plumb edge 38 of the square is placed against the rafter 80 and the plumb mark 92 made with the aid of the blade 70. In this example the plumb mark 92 is close to the end of the rafter so the square is flipped and placed on the top edge of the rafter to make the mark.

Figure 5:
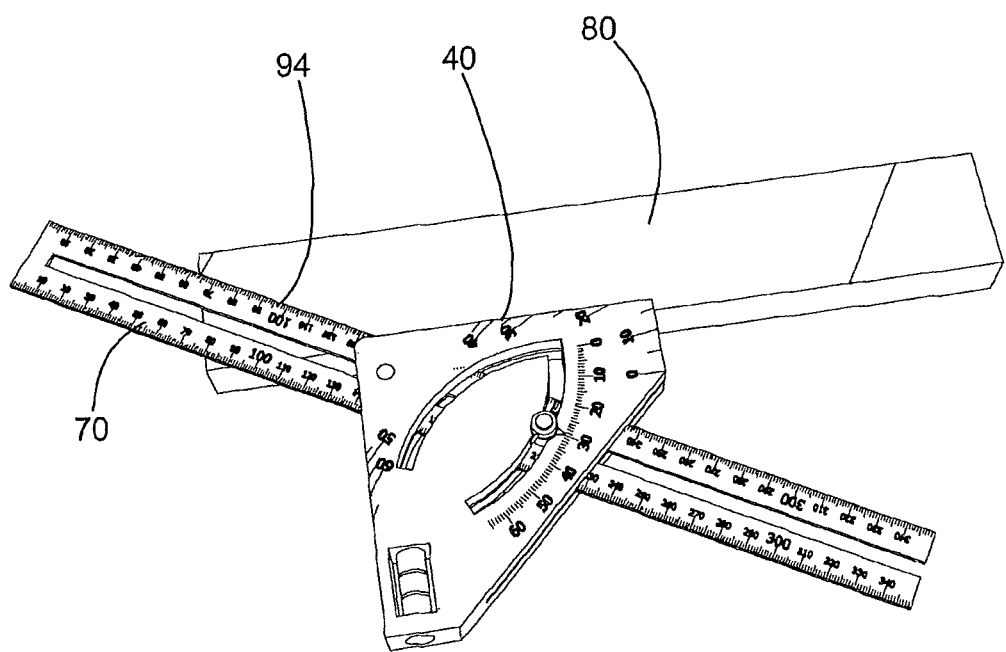
FIG. 5 shows the square being used to mark a bottom foot cut.

In FIG. 5 the square is rotated so that the foot edge 40 can be placed against the rafter 80 to make a bottom foot mark 94 with the ruler 70. No adjustment from making the plumb mark has been necessary; the tool has merely been rotated. The geometry of the tool ensures that the foot mark is perpendicular to any plumb mark.

In FIGS. 6 and 7 the square is used to mark a bird's mouth. In this example the blade is first retracted so that the depth of the bird's mouth can be accurately set with the aid of the ruler markings 73. The plumb edge 38 is placed against the rafter 80 and the plumb mark 96 and the first portion of the foot mark 98a is made. The square is then rotated and the foot edge 40 placed against the rafter to make the second portion 98b of the foot mark 98. Of course a bird's mouth could also be marked without first setting the blade depth.

Figure 10:
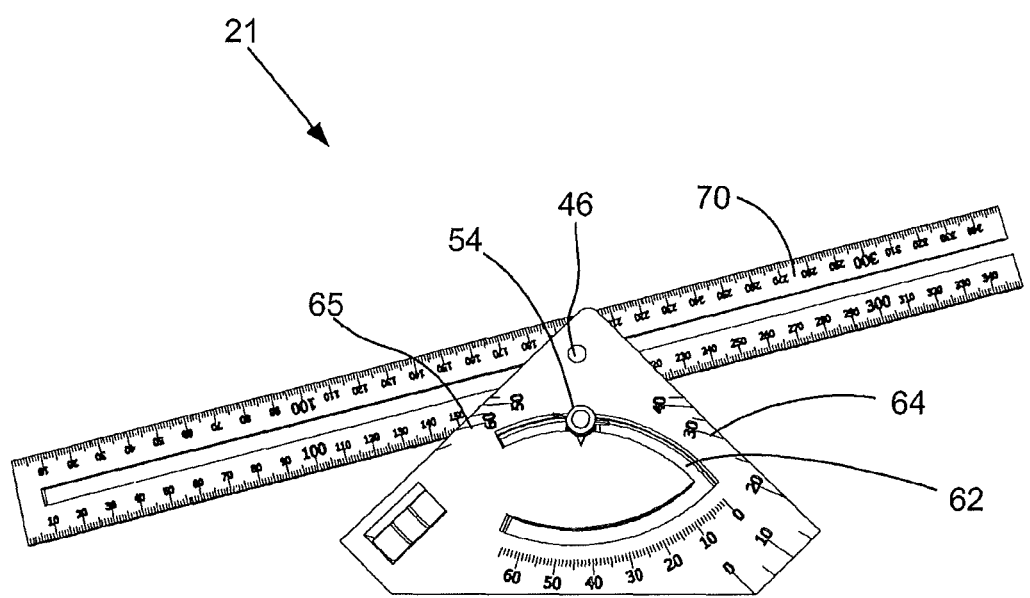
FIG. 10 shows the square in a secondary configuration.

The sequence outlined above produces a marked rafter shown as 82 in FIG. 8 which when cut provides the rafter 84 of FIG. 9. This is just one example of the use of the tool. Any desired pattern of plumb and foot marks can be easily made FIG. 10 shows the square in a secondary configuration which is quicker and more convenient to use in some situations, such as: when a combination of a shallow plumb cut and long foot cut is required; marking on very narrow or very broad material; or marking angle on the end of materials such as flush rafter tails or eave tails. To move from the primary configuration to the secondary configuration the lock 54 is first loosened and the blade 70 extracted so that it no longer engages the lock. The ruler is then rotated to the desired angle and extended/retracted as needed. The lock 54 is moved from the primary race 50 to the secondary race 62 and positioned adjacent to where the blade comes closest to the race. The lock is used just to clamp the blade, the pointer is ignored. The edge of the blade is used to set the desired angle against secondary scale 64 and 65. The secondary scale is complementary to the primary scale, and indicates the plumb angle instead of the foot/pitch angle. The square in FIG. 10 is configured for a plumb angle of 60 degrees, corresponding to a pitch angle of 30 degrees. This matches the previous example in FIGS. 1 to 7 showing the square in its primary configuration set for a pitch of 30 degrees. The square as configured in FIG. 10 can thus be used to make the identical set of marks seen in FIG. 8 produced by the tool as configured in FIGS. 1 to 7. The role of the plumb side 38 and foot side 40 is also reversed in the secondary configuration.

Figure 11:
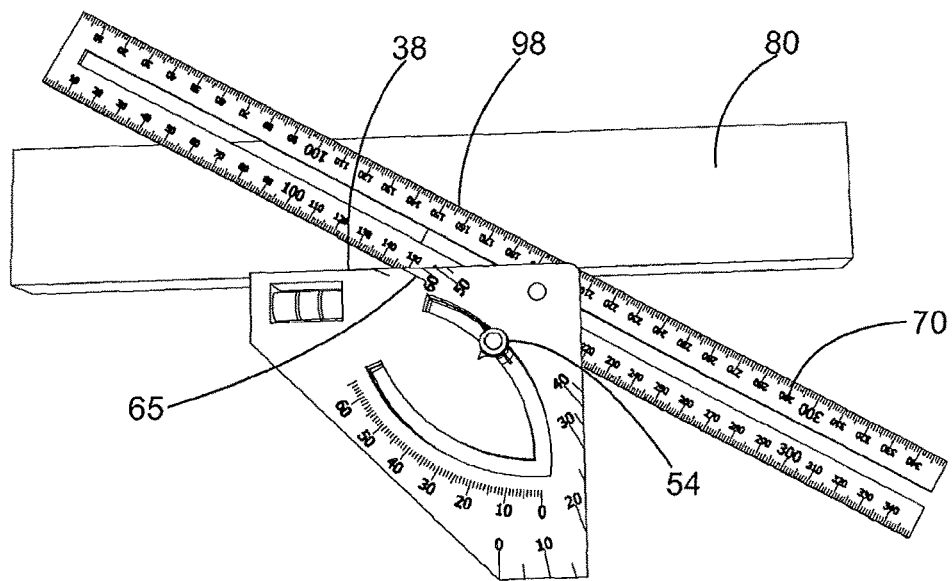
FIG. 11 shows the square of FIG. 10 being used to mark a foot cut of a bird's mouth.
Figure 12:
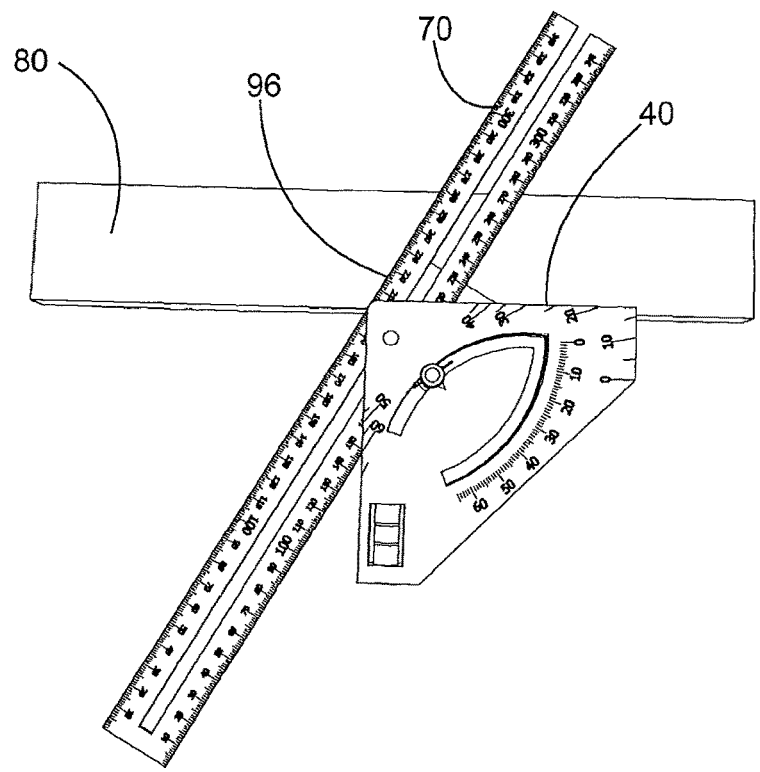
FIG. 12 shows the square of FIG. 10 of being used to mark a plumb cut of a bird's mouth.

FIGS. 11 and 12 show the square of FIG. 10 being used to make foot 98 and plumb 96 marks for a bird's mouth similar to FIGS. 6 and 7. As discussed above the square is first put in the secondary configuration and the secondary scale used to set the plumb angle, in this case 60 degrees which corresponds to a pitch angle of 30 degrees. The (plumb) edge 38 is placed against the rafter 80 and the foot mark 98 made with the aid of the ruler 70. The square is then rotated so that the (foot) edge 40 is against the rafter and the plumb mark 96 made. As with primary configuration any desired pattern of foot and plumb marks can be made.

Figure 13:
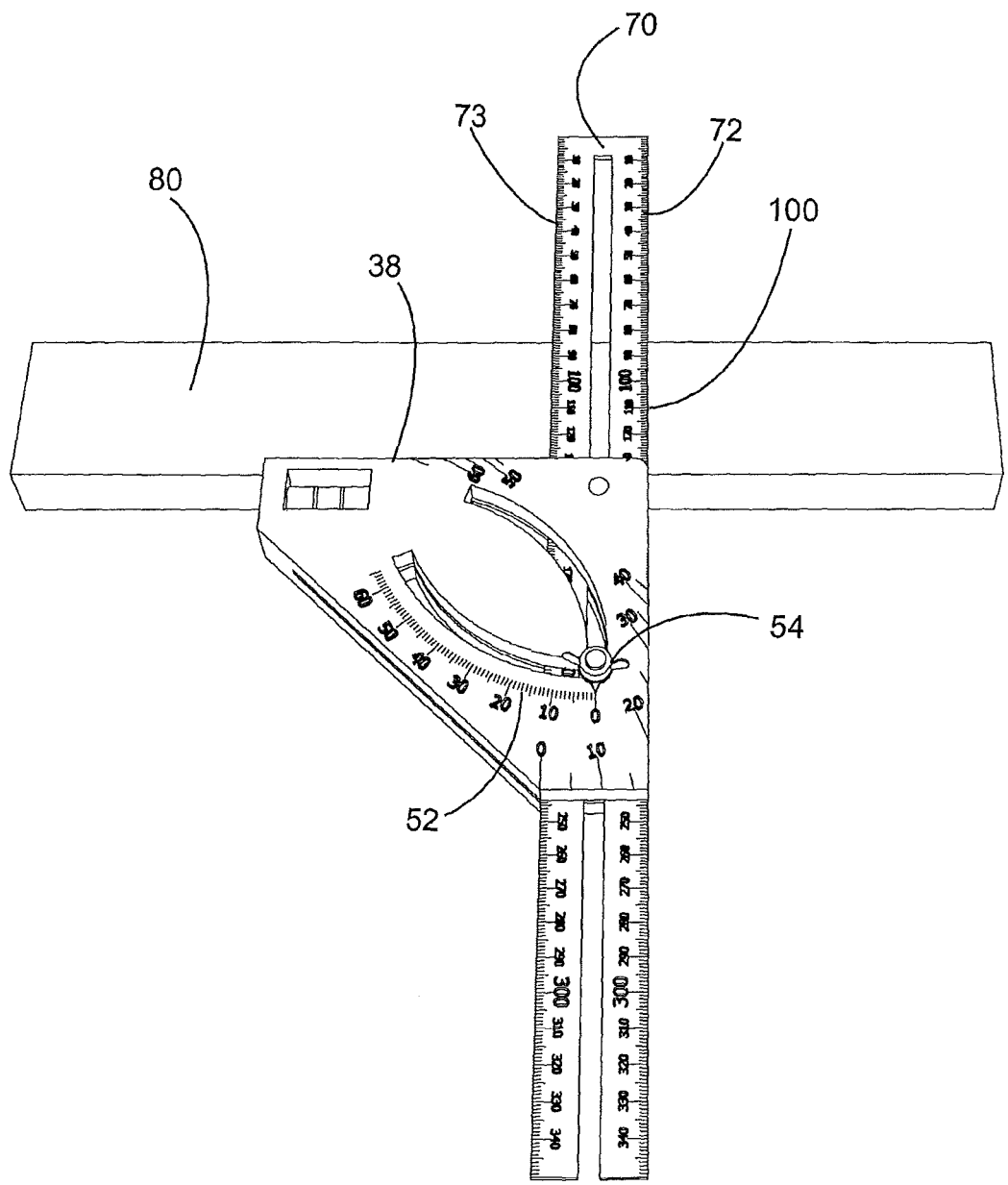
FIG. 13 shows the square being using to make a 90 degree mark.
Figure 14:
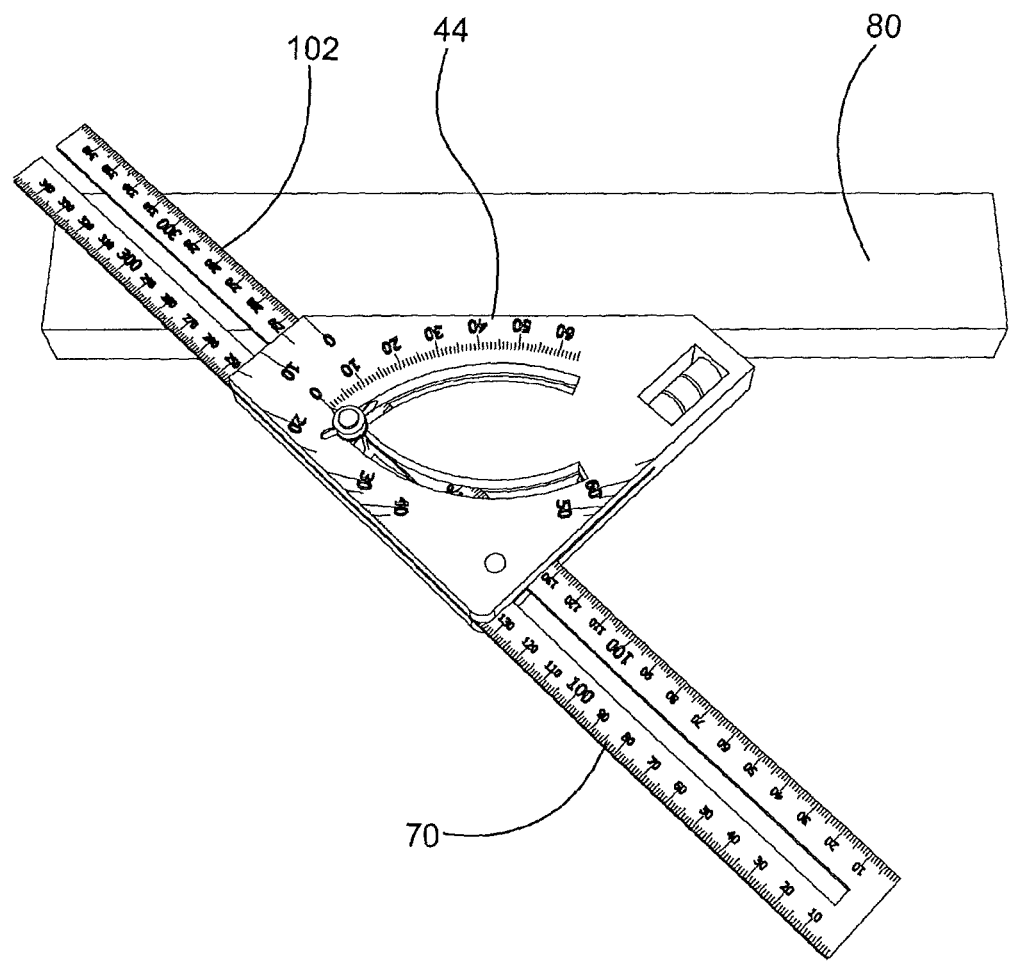
FIG. 14 shows the square being used to make a 45 degree mark.

The square can also be used in a similar fashion to a conventional square to easily make 90 degree and 45 degree marks. As seen in FIG. 13 the blade is first set to 0 degrees on the primary scale 52. This setting corresponds to the end of travel of the lock 54 in the primary race so it can be quickly and easily set. The plumb side 38 is placed against the rafter 80 and a 90 degree mark 100 made with the aid of the blade 70. The blade 70 can also be used as a gauge and set to a desired depth with the aid of ruler markings 72 and 73. To make a 45 degree mark 102 as seen in FIG. 14 the square is rotated and the hypotenuse side 44 placed against the rafter 80.

Second Embodiment

Figure 15:
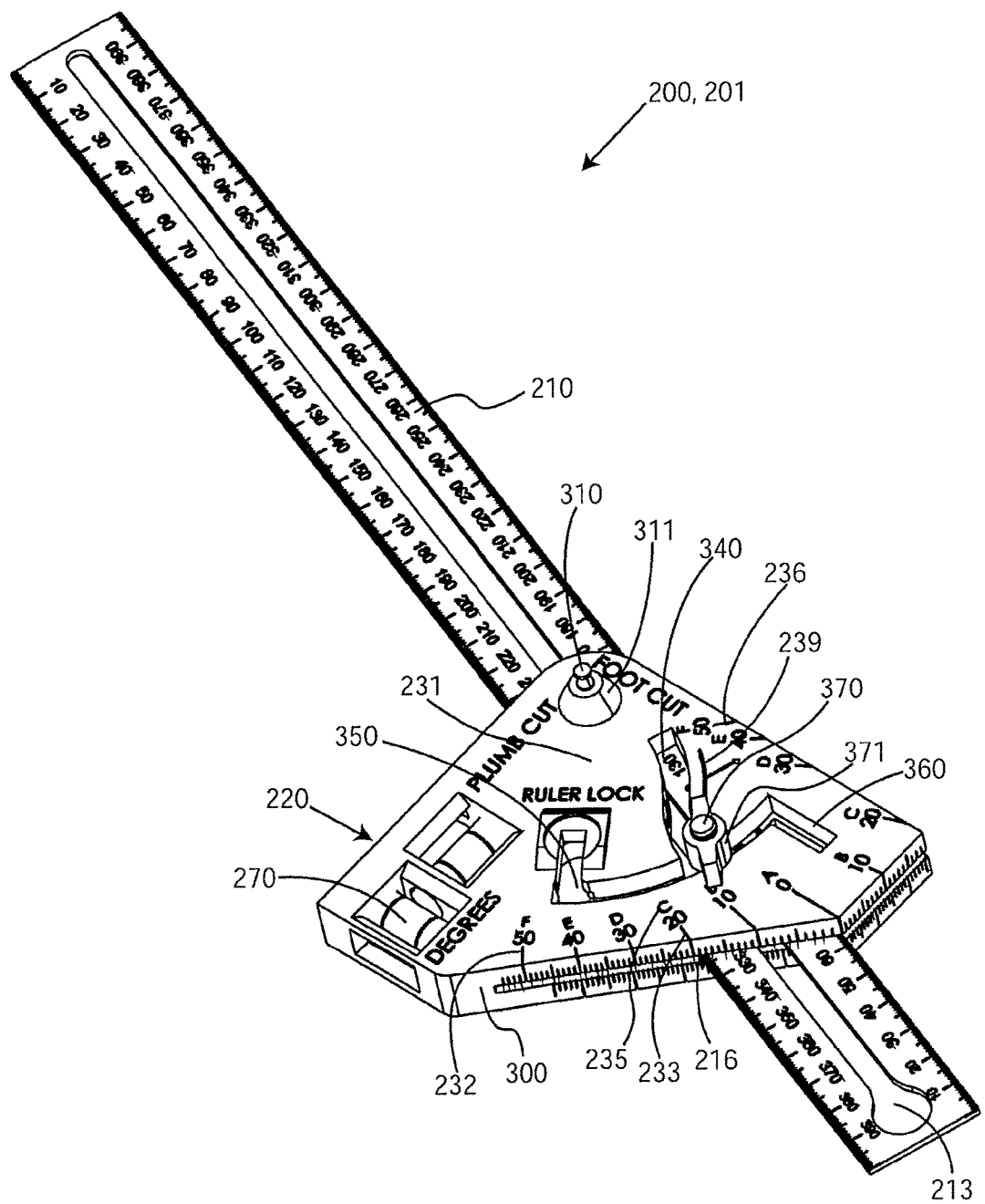
FIG. 15 is a front perspective view of the roof square of the present invention in accordance with a second embodiment and set for a 20 degree rafter cut.

A second embodiment of the roof square is shown as 200 in FIG. 15 and beyond. The second embodiment can be used in several configurations which are identified specifically as 201 for a first configuration, 202 for a second configuration and 203 for a hybrid configuration. The identifier 200 will be used to describe features common to the specific configurations.

The second embodiment 200 can be used the same way as the first embodiment 20; however the blade is different in that the void in the blade is closed at both ends thus preventing the blade from being unintentionally removed from the tool. The blade can be removed, but only by manipulation of two separate mechanisms. It is still necessary to disengage the blade from the locking mechanism to move it between the first and second configurations, so a novel blade locking and release mechanism has been incorporated into the design. A further mechanism allows the pivot pin to be partially extracted from the body to allow the blade to be detached. As the second embodiment is very similar to and operates in the same manner as the first embodiment, the features in common with the first embodiment will not be described again in detail. The second embodiment as shown includes some further differences to the first embodiment such as a second level vial perpendicular to the first level vial and scale markings along the side of the body instead of on the faces. In particular the second embodiment includes a second scale on the rear face, different to the first scale, to aid in marking out hip and valley rafters. The configuration of the secondary race is different; a locking race has been added to aid in moving the blade between first and second configurations; and a race for locking the blade in position for use as a traditional square has also been added. It is to be understood that further embodiments combining these changes with the first embodiment fall within the scope of the invention.

FIG. 15 shows a perspective view of a roof square 201 according to the second embodiment in a first configuration looking at the front face 231 of the body 220. This corresponds to FIG. 1 in which the first embodiment of the roof square 20 is shown. The most notable differences are: the configuration of the secondary race 340; the addition of a locking race 350 and a square race 360 branching from the primary race 320; the primary scale 232 and secondary scale 236 being moved to the edge of the device (and extending onto the hypotenuse side 300; primary alphabetic scale 234 and secondary alphabetic scale 237; second closed blade end 215, blade engagement void 213, and the pivot pin 310 protruding from the body of the tool in pivot housing 311. A scale pointer is not required in the second embodiment as the angle setting can be read from the primary scale 232 where it coincides with the left side 216 of the blade 210. A secondary scale indicator 239 sits between the secondary race 340 and the secondary scale 236 to indicate their association.

Figure 16:
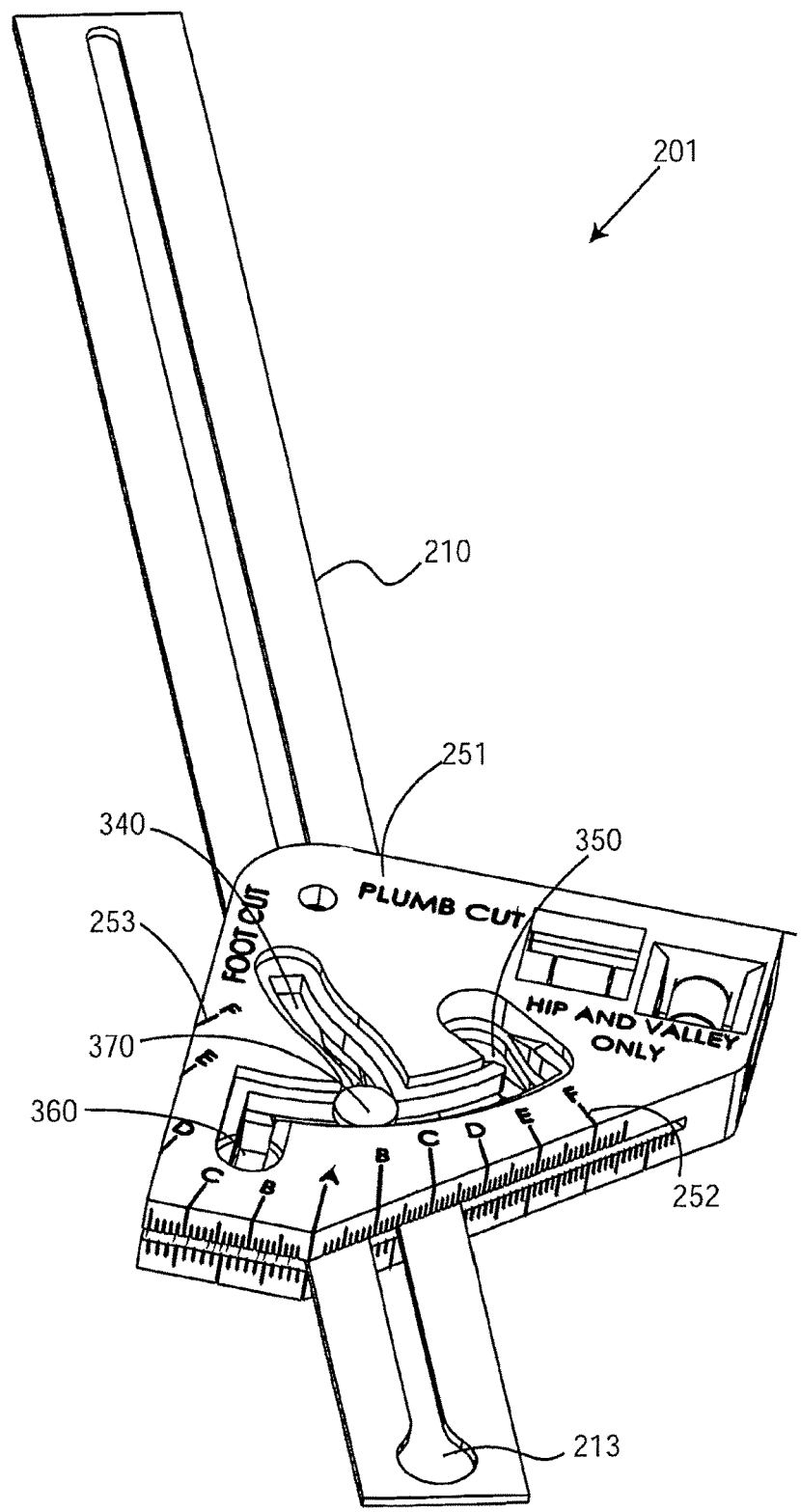
FIG. 16 is a rear perspective view of the second embodiment.

FIG. 16 shows the rear face 251 which comprises further features, including rear primary alphabetic scale 252 and rear secondary alphabetic scale 253. The rear scales are for use with hip and valley rafters which are cut at angles in the ratio of 1:--./2 to the normal rafter angles. The rear face further includes features of the primary race 320, locking race 350 and square race 360 as well as the secondary race 340.

The blade 210 has been shown with metric markings on the top side and no markings on the bottom side. The top side may alternatively be marked in imperial measurements. The bottom side may be marked in either imperial or metric measurements, either the same or different to the top scale. The bottom side may also be a mirror image of the top side to allow for a 'normal' or a mirror scale to be selected on either side of the tool as desired by the user.

FIG. 15 also shows use of the primary scale 232 to set the desired pitch angle for the square in its first configuration 201. In this instance a pitch angle of 20° is being set by rotating the marking blade 210 until its left side 216 aligns with the 20° mark 223 on the primary scale 232. The lock nut 371 is then tightened to secure the blade in place. The plumb cut and foot cut markings can then be made using the respective edges.

Figure 17:
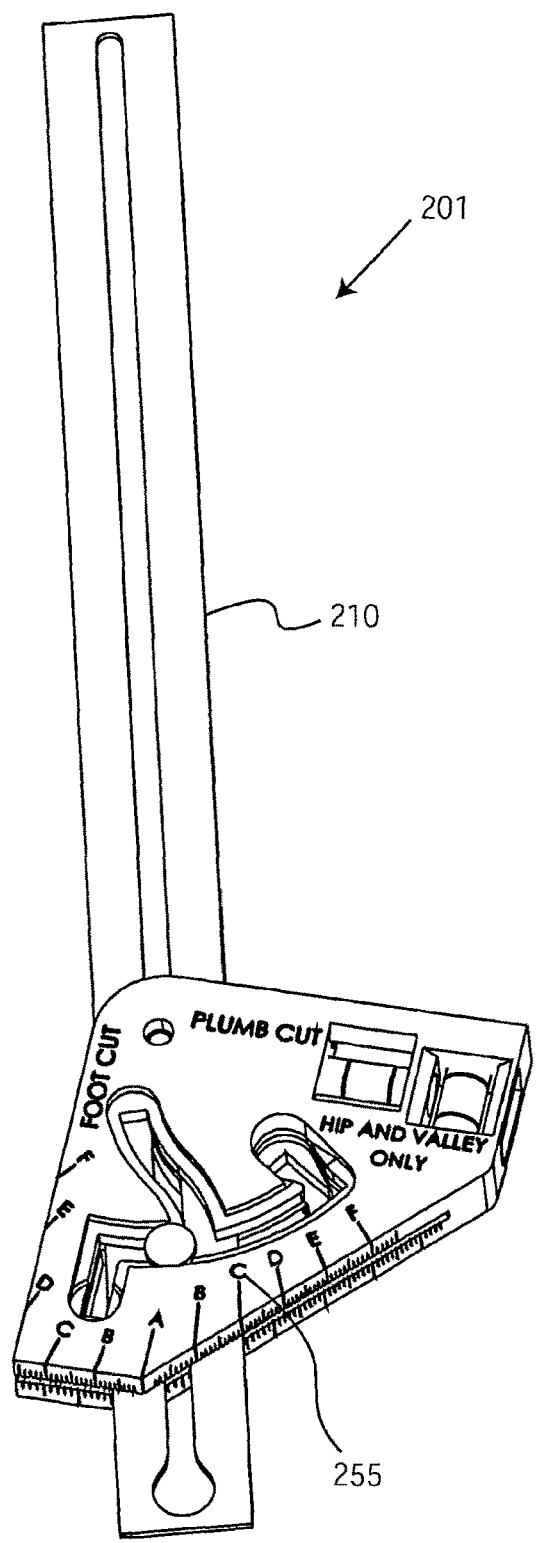
FIG. 17 shows the rear of the roof square set for marking a 20 degree hip or valley rafter cut.

With the blade set for a pitch of 20° on the primary scale 232, it can be seen that this setting corresponds to the "C" mark 225 on the primary alphabetic scale 234. If it was now desired to mark a hip or valley rafter for a roof with a 20° pitch then the "C" mark 255 on the rear primary alphabetic scale 252 can be used as shown in FIG. 17. The marking blade 210 will need to be rotated to achieve this as the rear scales differ from the front scales by a factor of 1:"12. For ready comparison FIG. 16, the rear view of FIG. 15, shows the square set for a normal 20° cut, whereas FIG. 17 shows the rear of the roof square set for a hip or valley cut of 20°. In FIG. 17, the square has effectively been set to an angle of 20°|"12=14.1°. Notably the user of the square does not have to perform this calculation; it is achieved by the ratio of the front and rear scales. Alternatively the rear scale could have been marked with a true numerical scale and the calculation left to the user; or, the rear scale could have been marked with a "scaled" scale, i.e. a 20° marking at the true 14.1° degree position. The alphabetic scales have been chosen to ensure that an incorrect numerical scale cannot be inadvertently used.

Figure 18:
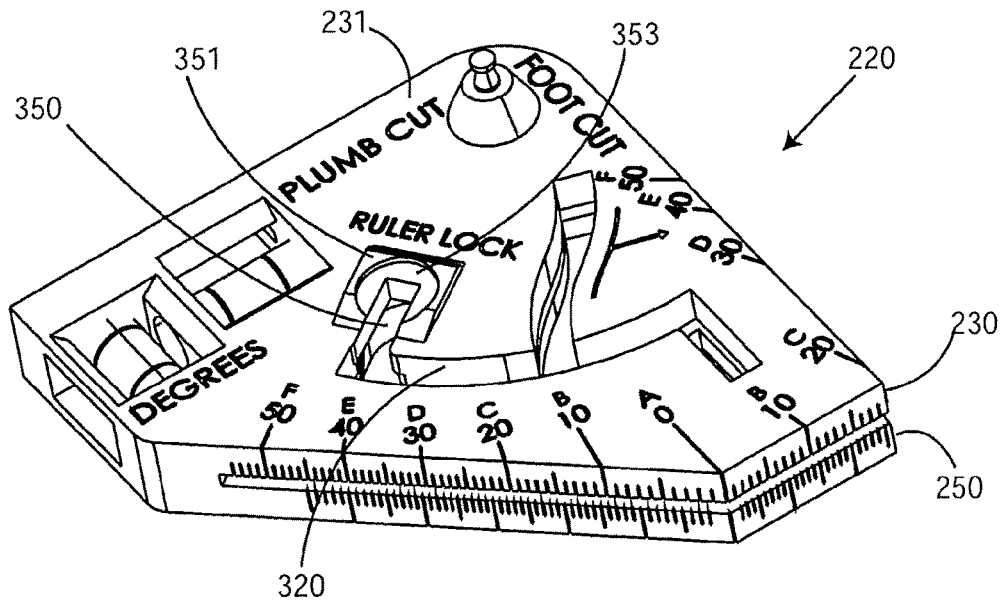
FIG. 18 shows the body of the square in isolation from the front.
Figure 19:
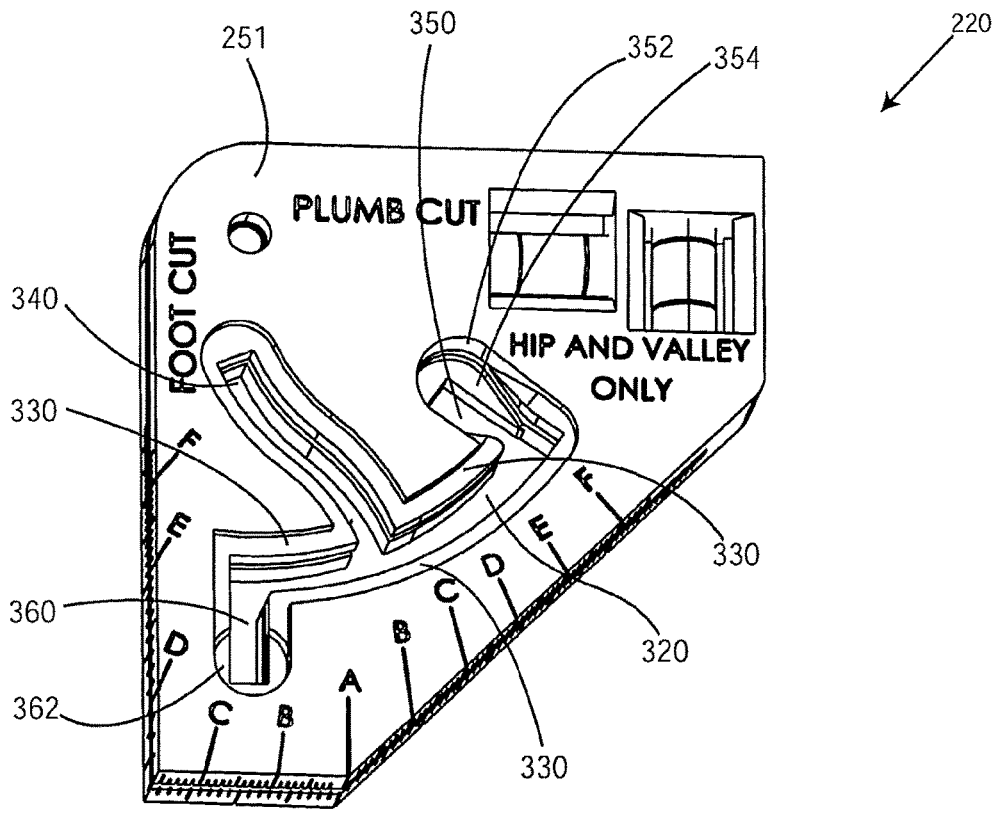
FIG. 19 shows the body of the square in isolation from the rear.

FIGS. 18 and 19 show the body 220 of the square in isolation from front and rear perspectives to allow the features of the races to be better seen. The primary race 320 extends in an arc across the body and retains the locking bolt 370 when the square is in its first configuration 201 (as seen in FIG. 15). From the primary race the locking bolt can move into three other races for secondary functions. The locking race 350 is used to engage or disengage the locking bolt and the blade 210 so that square can transform between the first configuration 201 and the second configuration 202. When in the second configuration the locking bolt moves in the secondary race 340 until it abuts the edge of the blade and the bolt is then used to lock the blade at the desired setting (e.g. in FIG. 22). The square race 360 is used when the blade is to be locked at 90°. This exists as a separate race so that the square can be quickly and easily set at 90° without the need to carefully align the blade with the scale. The locking bolt extends above the front face 231 of the square so that the lock nut 371 can be attached. As the lock nut 371 is tightened the top layer 230 and bottom layer 250 of the body are pulled together to clamp the locking blade in a desired position. On the rear face 251 the races are surrounded by a race step 330 that allows the head of the locking bolt 370 to sit flush with the rear face of the square, allowing the square to sit flat when placed down on its rear face.

Figure 20:
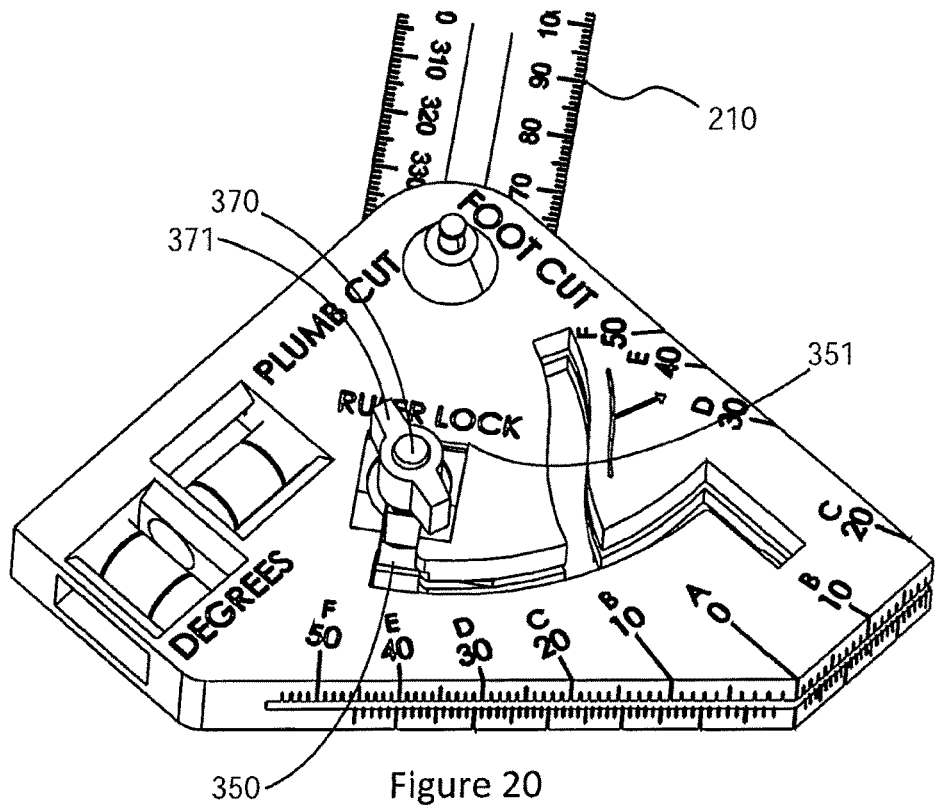
FIG. 20 shows a front view of the square with the blade being disengaged from the locking bolt to allow it to move between configurations.
Figure 21:
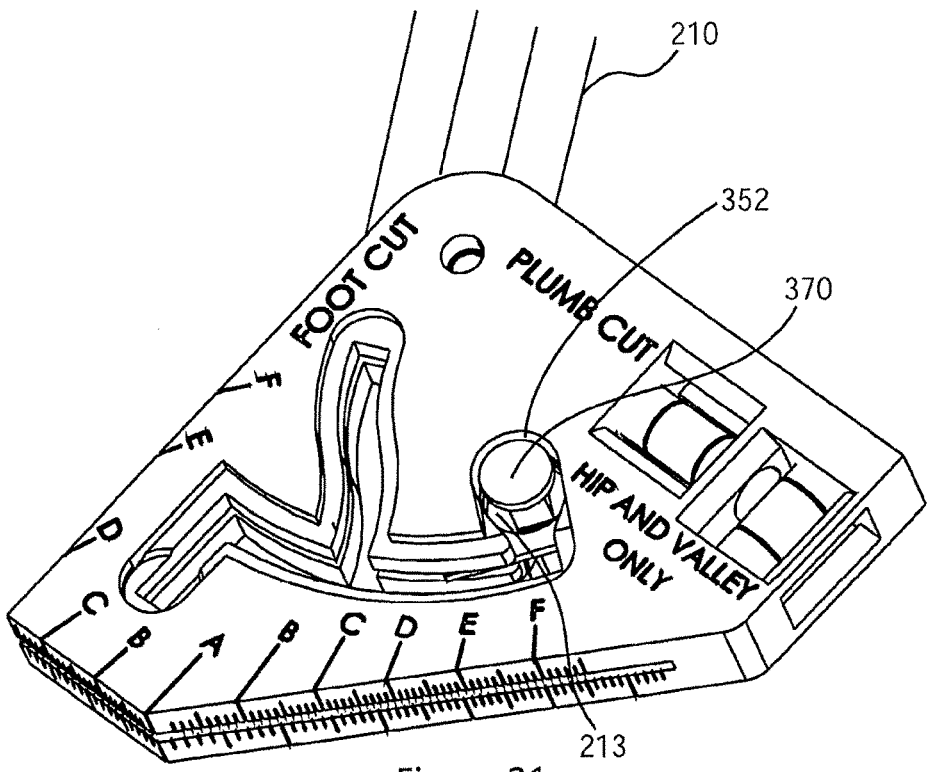
FIG. 21 shows a rear view of the square with the blade being disengaged from the locking bolt to allow it to move between configurations.

Referring also to FIGS. 20 and 21, to disengage the blade 210 from the locking bolt 370, the head of the locking bolt is pulled through the engagement void 213 of the blade. To do this the lock nut 371 is first loosened to allow movement of the locking bolt and blade. The locking bolt is then moved to the end of the locking race 350 until the lock nut 371 sits atop the locking platform 351 and in locking recess 353. Aligned with the locking platform is a locking void 352 which is sized to allow the head of the locking bolt 370 to pass through the bottom layer 250 of the square. The blade is positioned so that the blade engagement void 213 aligns with the locking void 352, allowing the head of the locking bolt to also pass through the locking blade, thus freeing the blade from the locking bolt. The top layer 230 includes a locking step 354 to accommodate the head of the locking bolt after it passes through the ruler. The head of the locking bolt sits flush with the surface of the top layer inside the square to allow free movement of the blade inside the body. The lock nut can then be tightened to hold the locking bolt in place with the locking platform 351, limiting the amount by which the lock nut needs to be tightened. Once disengaged the blade is free to move to the second configuration 202 as shown in FIG. 22.

Figure 22:
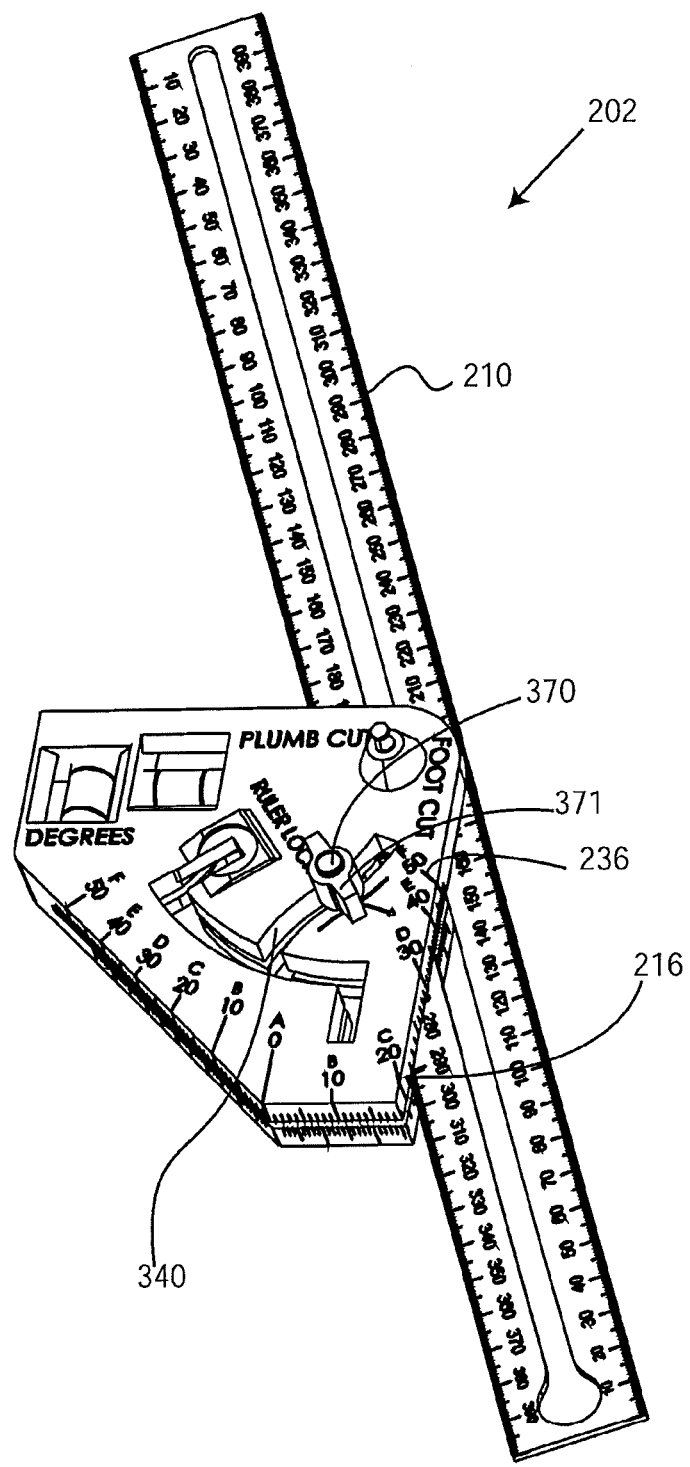
FIG. 22 shows the square in the second configuration in which the locking bolt is disengaged from the blade.
Figure 23:
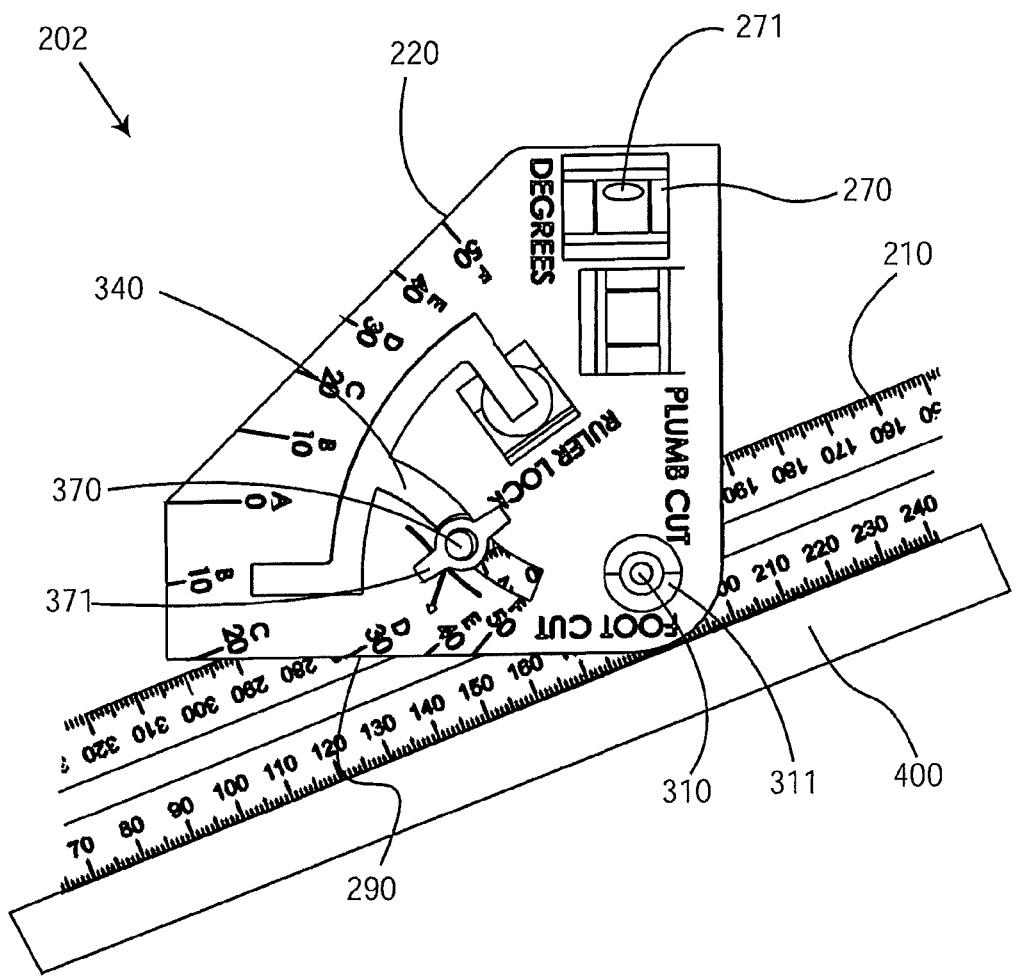
FIG. 23 shows how the angle of the square can be set from an existing rafter.

After the blade 210 has been disengaged it can be moved to a position as in FIG. 22 to operate in the square in a secondary configuration 202 in which the secondary scale 236 is used to set the desired rafter angle against the left side 216 of the blade. The locking bolt 370 is moved into the secondary race until it comes in contact with the blade after which the lock nut 371 is tightened to keep the blade in place.

The blade angle may be set to match the angle of a rafter that is already in place, abrogating the need to even measure the rafter angle. This is demonstrated in FIG. 23 in which the blade 210 of a square is placed on top of a rafter 400. The body of the square can then be rotated about pivot pin 310 until the bubble 271 of the vial 270 indicates that the foot cut side 290 is parallel with the ground. As the body 220 of the square rotates the locking bolt 370 will 'ride' the blade in the secondary race 340. Once the body is in position the lock nut 371 can be tightened to secure the angle setting and the square then used to mark plumb and foot cuts on new rafters. If desired the angle setting could be transferred to the secondary side using the alphabetic scales as discussed previously for marking cuts on hip and valley rafters. By combining these steps it is thus possible to accurately mark hip and valley rafters from a normal rafter without taking a single measurement or making a single calculation.

To re-engage the locking bolt 370 with the blade 210 the blade is moved such that the engagement void 213 is once again aligned with the locking platform 351 and the locking void 352. The procedure described above for disengaging the blade and locking bolt is then reversed.

Figure 24:
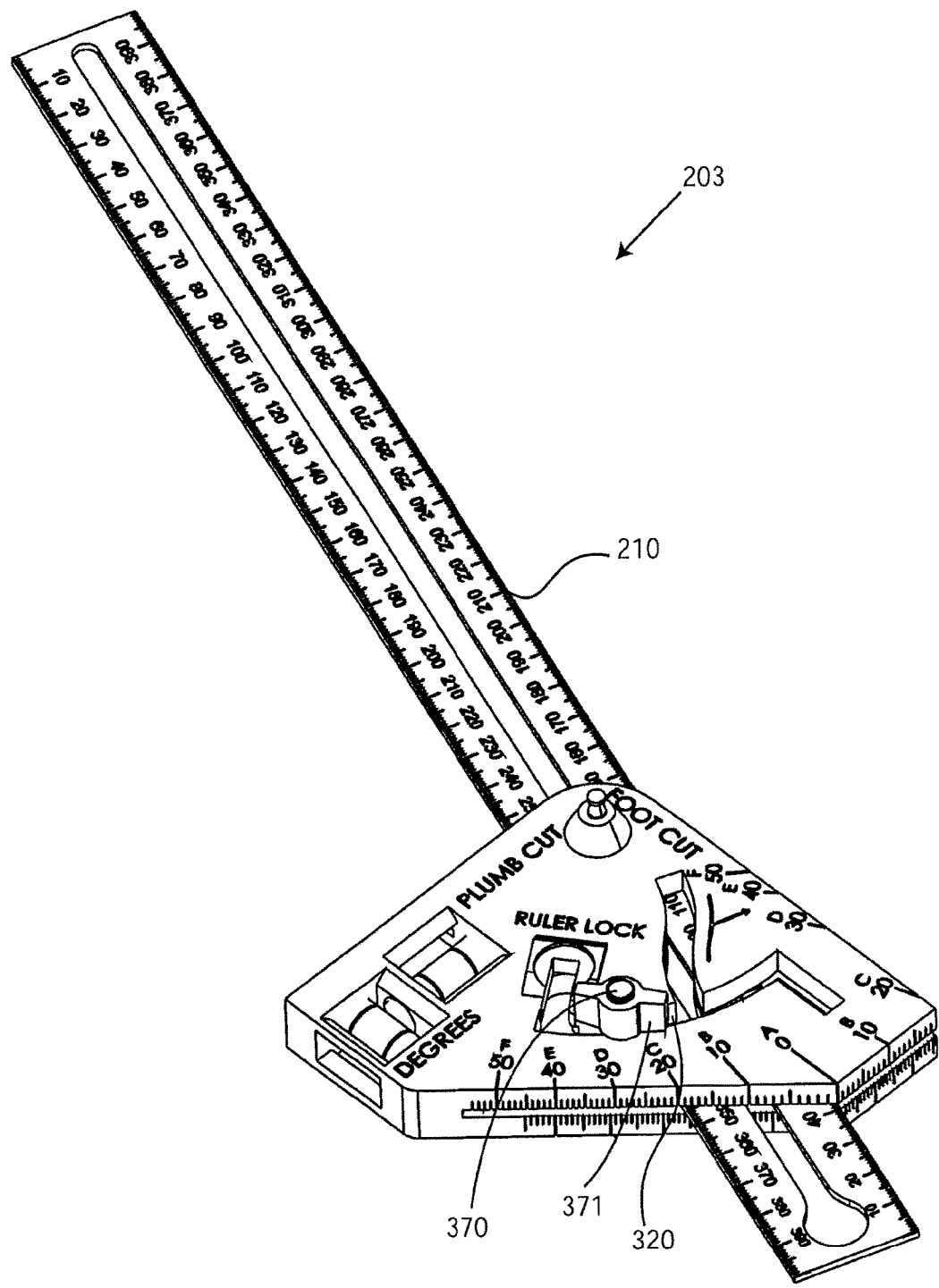
FIG. 24 shows a hybrid configuration in which the ruler is disengaged from the locking bolt, but still passes through the hypotenuse side of the square.

In addition to the primary configuration 201 shown in FIG. 15 and secondary configuration 202 shown in FIG. 22, it is also possible to operate the square in a hybrid configuration 203 as shown in FIG. 24. In this configuration the blade 210 is disengaged from the locking bolt 370, but still passes through the hypotenuse side 300 of the square whilst the locking bolt remains in the primary race 320.

Figure 25:
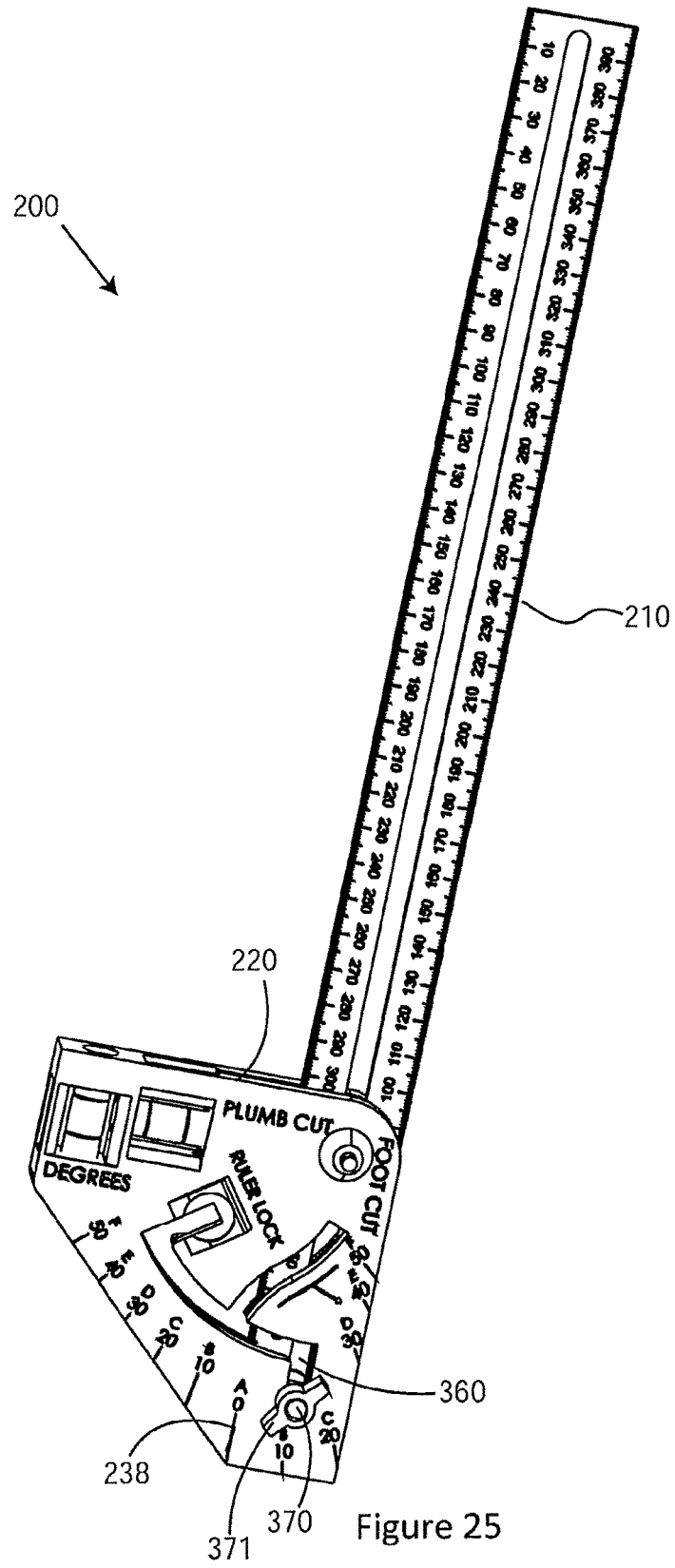
FIG. 25 shows the square configured as a 'square'.

The square 200 can also be used as a traditional square as seen in FIG. 25. The blade 210 is rotated until it is at the 0° mark 238. This can be easily achieved by moving the locking bolt 370 until it is in the square race 360. The blade can be moved in and out of the body to set the depth of the blade if desired. The locking bolt is preferably positioned at the end of the square race in which position the head of the locking bolt can engage the square locking recess 362 seen in FIG. 19. This prevents movement of the locking bolt in the square race, as the depth of the blade is adjusted. Once set at the correct depth the lock nut 371 can be further tightened to secure the depth setting.

Figure 26:
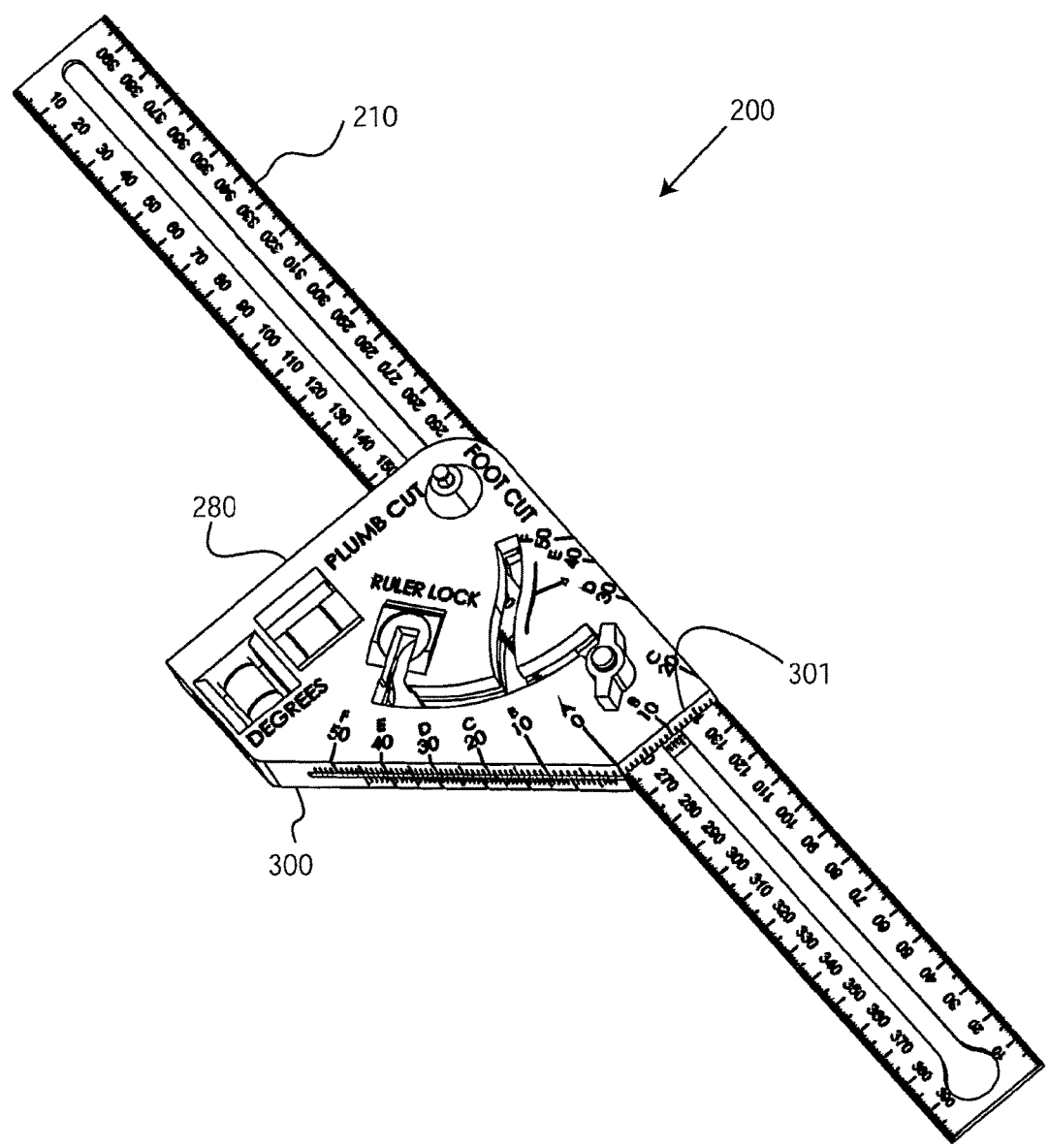
FIG. 26 shows the square configured for marking at 45 degrees.

In FIG. 26 the blade is set to partially extend from the plumb cut side and also the return end 301 of the hypotenuse side 300 to either set a depth for the blade or use the blade in conjunction with the hypotenuse side to execute 45° markings.

Figure 27:
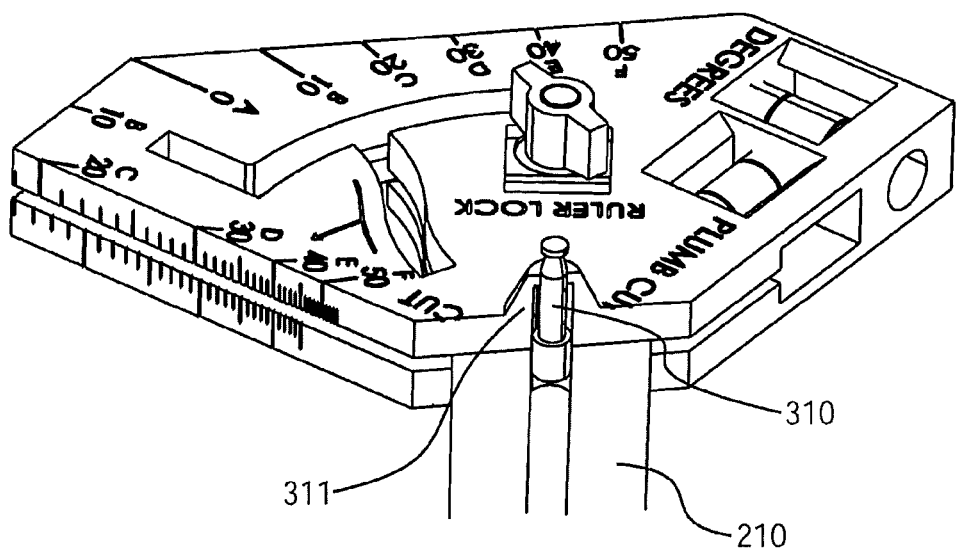
FIG. 27 is a cutaway view of the square showing the pivot pin engaged with the ruler.
Figure 28:
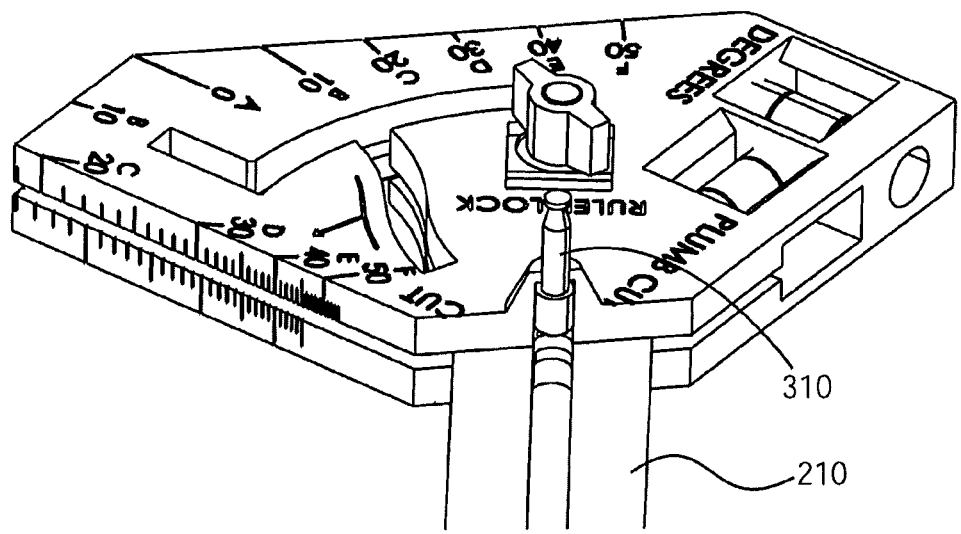
FIG. 28 is a cutaway view of the square showing the pivot pin disengaged from the ruler.

FIGS. 27 and 28 show cutaway views of the roof square detailing the pivot pin 310 in the pivot pin housing 311 located at the vertex of the plumb and foot sides. In normal use the pivot pin sits low within the housing and engages the ruler 210 as per FIG. 27. The ruler can slide back and forth or rotate about the pivot pin. To allow the ruler to be removed from the body the pivot pin can be raised as shown in FIG. 28 until it is clear of the ruler. Not shown are a grub screw to retain the pivot pin in the body and a spring to bias the pin such that it engages the ruler.

The reader will now appreciate the present invention which combines the functionality of several conventional tools to provide a single square that can be used to make any desired foot or plumb marks, easily make 90 and 45 degree marks and also provides a gauge, ruler and a level. The square can be easily set to match the angle of existing rafters and can switch between marking normal rafters to hip and valley rafters without the need to do any manual calculations.

Whilst the square has been described in its preferred embodiment, many other embodiments are also possible. The essence of the invention is having two sides of the square at 90 degrees to each other and a blade pivot pining at or adjacent to the vertex formed at their intersection. The actual shape of the body is unimportant, beyond having two perpendicular sides. Other embodiments are advantageous in terms of simplicity or providing other angles that can be easily marked. In a further embodiment the body is shaped as a square. In a still further embodiment the secondary race and scales are absent. In a still further embodiment the primary race and scale is absent. In a still further embodiment the blade is unable to be extended or retracted.

Further advantages and improvements may very well be made to the present invention without deviating from its scope. Although the invention has been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus. Any discussion of the prior art throughout the specification should in no way be considered as an admission that such prior art is widely known or forms part of the common general knowledge in this field.

In the present specification and claims (if any), the word "comprising" and its derivatives including "comprises" and "comprise" include each of the stated integers but does not exclude the inclusion of one or more further integers.

The invention claimed is:

1. A tool for marking rafters, comprising a body with a top layer, a bottom layer, a first plumb side and a second foot side disposed at 90 degrees to the first plumb side, and a marking blade pivotally mounted to a pivot pin proximal a vertex of the first and second sides, wherein the marking blade passes between the top layer and the bottom layer.

2. A tool as in claim 1 wherein the marking blade is slidably mounted to the pivot pin by a void extending along the marking blade.

3. A tool as in claim 2 further comprising a lock engaging the void for preventing movement of the locking blade with respect to the body.

4. A tool as in claim 2 wherein the void extends to a first end of the blade thereby allowing the blade to be disengaged from the pivot pin.

5. A tool as in claim 2 wherein the pivot pin is moveable thereby allowing the pivot pin to be disengaged from the blade.

6. A tool as in claim 3 wherein the void extends to a first end of the blade therefore allowing the blade to be disengaged from the lock.

7. A tool as in claim 3 wherein the lock is moveable thereby allowing the lock to be disengaged from the blade.

8. A tool as in claim 1 wherein the blade passes through the first and second sides.

9. A tool as in claim 1 further comprising a third hypotenuse side disposed at 45 degrees to the first side and the second side, wherein the blade passes through the third side.

10. A tool as in claim 1 further comprising a first scale on a face of the top layer indicating angular displacement of the blade with respect to the second side, and a second scale on a face of the bottom layer, wherein the second scale is set at a ratio of the square root of two to one to the first scale.

* * * * *